(12) United States Patent
Baskar et al.

(10) Patent No.: US 10,696,147 B2
(45) Date of Patent: Jun. 30, 2020

(54) PRESSURIZED SEALING SYSTEMS FOR VEHICLE CLOSURE MEMBERS

(71) Applicant: FORD GLOBAL TECHNOLOGIES, LLC, Dearborn, MI (US)

(72) Inventors: Shunmugam Baskar, West Bloomfield, MI (US); Lohitha Dewasurendra, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/830,531

(22) Filed: Dec. 4, 2017

(65) Prior Publication Data

US 2019/0168592 A1  Jun. 6, 2019

(51) Int. Cl.
| | | |
|---|---|---|
| *E06B 7/18* | (2006.01) | |
| *B60J 10/244* | (2016.01) | |
| *B60J 10/40* | (2016.01) | |
| *B60J 10/86* | (2016.01) | |
| *B60J 10/84* | (2016.01) | |

(52) U.S. Cl.
CPC ............. *B60J 10/244* (2016.02); *B60J 10/40* (2016.02); *B60J 10/84* (2016.02); *B60J 10/86* (2016.02)

(58) Field of Classification Search
CPC . B60J 10/244; B60J 10/84; B60J 10/40; B60J 10/86
USPC ............................................ 49/477.1; 296/56
See application file for complete search history.

(56) References Cited

U.S. PATENT DOCUMENTS

| | | | | |
|---|---|---|---|---|
| 3,178,779 | A * | 4/1965 | Clark ..................... | B64C 1/14 220/232 |
| 4,371,175 | A * | 2/1983 | Van Dyk, Jr. ......... | E06B 7/2318 174/357 |
| 4,664,437 | A * | 5/1987 | Queveau .................. | B60J 5/101 296/106 |
| 4,870,783 | A * | 10/1989 | Hermann ............... | B60J 10/244 49/477.1 |
| 4,924,629 | A * | 5/1990 | Smith .................... | B60J 10/244 49/477.1 |
| 5,046,285 | A | 9/1991 | Fratini, Jr. et al. | |
| 5,489,104 | A * | 2/1996 | Wolff ..................... | B60J 10/244 277/646 |
| 6,000,747 | A * | 12/1999 | Sehgal .................... | B60J 5/101 296/146.11 |
| 6,098,992 | A * | 8/2000 | Long ...................... | B60J 10/00 277/637 |

(Continued)

FOREIGN PATENT DOCUMENTS

| | | |
|---|---|---|
| CN | 203637534 U | 6/2014 |
| CN | 104786793 B | 9/2016 |

(Continued)

*Primary Examiner* — Jerry E Redman
(74) *Attorney, Agent, or Firm* — David Coppiellie; Carlson, Gaskey & Olds

(57) ABSTRACT

A vehicle closure member sealing system includes a first seal including a first bulb section and an inflatable geometric feature disposed on a discrete portion of the first seal. The inflatable geometric feature includes a second bulb section separate from the first bulb section. A pressure source is configured to communicate a fluid into the second bulb section to inflate the inflatable geometric feature between a first position and a second position. The vehicle closure member sealing system may be utilized to seal a side door or liftgate.

17 Claims, 5 Drawing Sheets

(56) References Cited

U.S. PATENT DOCUMENTS

| | | | | |
|---|---|---|---|---|
| 6,102,470 A * | 8/2000 | Heim | | B60J 5/101 |
| | | | | 293/133 |
| 6,203,094 B1 * | 3/2001 | Lee | | B60J 1/1884 |
| | | | | 296/106 |
| 6,922,945 B2 * | 8/2005 | Dron | | F16J 15/46 |
| | | | | 49/475.1 |
| 7,837,252 B2 * | 11/2010 | Etou | | B60J 5/101 |
| | | | | 296/146.4 |
| 8,123,277 B2 * | 2/2012 | Aldersley | | B60J 5/107 |
| | | | | 296/146.8 |
| 8,123,278 B1 * | 2/2012 | McKenney | | B60J 5/0479 |
| | | | | 296/146.9 |
| 8,328,268 B2 * | 12/2012 | Charnesky | | B60J 5/0479 |
| | | | | 277/644 |
| 8,328,269 B2 * | 12/2012 | Krajenke | | B60R 13/0243 |
| | | | | 296/146.1 |
| 8,555,552 B2 | 10/2013 | Hooton | | |
| 8,857,883 B2 * | 10/2014 | Kargilis | | B60R 16/023 |
| | | | | 296/146.9 |
| 9,186,965 B2 * | 11/2015 | Lathwesen | | B60J 5/107 |
| 2006/0010779 A1 * | 1/2006 | Schlachter | | B60J 10/244 |
| | | | | 49/477.1 |
| 2009/0255187 A1 * | 10/2009 | Alexander | | B60J 10/244 |
| | | | | 49/477.1 |
| 2010/0132264 A1 * | 6/2010 | Campbell | | E06B 7/2318 |
| | | | | 49/477.1 |
| 2012/0133175 A1 * | 5/2012 | Charnesky | | B60J 10/40 |
| | | | | 296/146.4 |
| 2012/0153678 A1 * | 6/2012 | Konchan | | B60J 5/0479 |
| | | | | 296/202 |
| 2013/0047519 A1 * | 2/2013 | Hooton | | B60J 10/244 |
| | | | | 49/477.1 |
| 2016/0243973 A1 * | 8/2016 | Goode | | B60P 3/34 |
| 2018/0216737 A1 * | 8/2018 | Hellholm | | B60F 3/0015 |

FOREIGN PATENT DOCUMENTS

| | | | | |
|---|---|---|---|---|
| GB | | 911954 A | * 12/1962 | ............ B60J 10/24 |
| GB | | 2067637 A | 7/1981 | |
| JP | | H09207571 A | 8/1997 | |
| KR | | 20020055341 A | 7/2002 | |

* cited by examiner

PRESSURIZED SEALING SYSTEMS FOR VEHICLE CLOSURE MEMBERS

TECHNICAL FIELD

This disclosure relates to pressurized sealing systems for sealing about vehicle closure members during door closing events and during vehicle driving events to mitigate noise transmission.

BACKGROUND

Vehicles utilize doors and other closure members for allowing passengers to enter and exit the vehicle and for loading/unloading cargo into/from the vehicle. One or more seals are typically provided between each movable closure member and the vehicle body to reduce noise and to prevent moisture from entering the vehicle passenger compartment through the closure member openings. Known closure member sealing systems do not consistently reduce noise during vehicle driving events.

SUMMARY

A vehicle closure member sealing system according to an exemplary aspect of the present disclosure includes, among other things, a first seal including a first bulb section and an inflatable geometric feature disposed on a discrete portion of the first seal. The inflatable geometric feature includes a second bulb section separate from the first bulb section. A pressure source is configured to communicate a fluid into the second bulb section to inflate the inflatable geometric feature between a first position and a second position.

In a further non-limiting embodiment of the foregoing vehicle closure member sealing system, the pressure source is a pump and the fluid is a compressed air.

In a further non-limiting embodiment of either of the foregoing vehicle closure member sealing systems, the first seal is an elastomeric weatherstrip.

In a further non-limiting embodiment of any of the foregoing vehicle closure member sealing systems, a control system is configured to command the pressure source to communicate the fluid during vehicle driving events.

In a further non-limiting embodiment of any of the foregoing vehicle closure member sealing systems, the vehicle driving events are detected by a sensor system.

In a further non-limiting embodiment of any of the foregoing vehicle closure member sealing systems, the control system is configured to command the pressure source to deflate the inflatable geometric feature during door closing events.

In a further non-limiting embodiment of any of the foregoing vehicle closure member sealing systems, the inflatable geometric feature is molded into the first seal.

In a further non-limiting embodiment of any of the foregoing vehicle closure member sealing systems, the inflatable geometric feature is attached to the first seal.

In a further non-limiting embodiment of any of the foregoing vehicle closure member sealing systems, the first seal seals against a wedge bumper.

In a further non-limiting embodiment of any of the foregoing vehicle closure member sealing systems, the first seal is mounted to a vehicle body, and comprising a second seal that is mounted to a side door.

In a further non-limiting embodiment of any of the foregoing vehicle closure member sealing systems, the first seal is mounted to a vehicle body.

A vehicle according to another exemplary aspect of the present disclosure includes, among other things, a vehicle body, a liftgate movably mounted to the vehicle body, and a sealing system for sealing a gap between the vehicle body and the liftgate. The sealing system includes a first seal and a second seal. At least one of the first seal and the second seal includes an inflatable geometric feature that can be inflated between a first position and a second position to seal the gap.

In a further non-limiting embodiment of the foregoing vehicle, a wedge bumper is mounted to the liftgate.

In a further non-limiting embodiment of either of the foregoing vehicles, the at least one of the first seal and the second seal seals against the wedge bumper in the second position.

In a further non-limiting embodiment of any of the foregoing vehicles, each of the first seal and the second seal include the inflatable geometric feature.

In a further non-limiting embodiment of any of the foregoing vehicles, in the second position, the inflatable geometric feature seals against an inflatable wedge seal.

In a further non-limiting embodiment of any of the foregoing vehicles, in the second position, the inflatable geometric feature seals against a wedge bumper.

In a further non-limiting embodiment of any of the foregoing vehicles, the sealing system includes a pressure source for inflating the inflatable geometric feature.

In a further non-limiting embodiment of any of the foregoing vehicles, a control system is configured to command the pressure source to inflate the inflatable geometric feature during vehicle driving events.

In a further non-limiting embodiment of any of the foregoing vehicles, the control system is configured to command the pressure source to deflate the inflatable geometric feature during a closing event of the liftgate.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details sealing systems for sealing around vehicle closure members. The sealing systems include one or more seals having inflatable geometric features that are positioned along a localized section of the seals. The inflatable geometric features can be inflated between a first position and a second position during certain vehicle conditions to decrease noise intrusion, or can be deflated during door closing events to decrease door closing efforts. These and other features of this disclosure are described in greater detail below.

Figure 1:
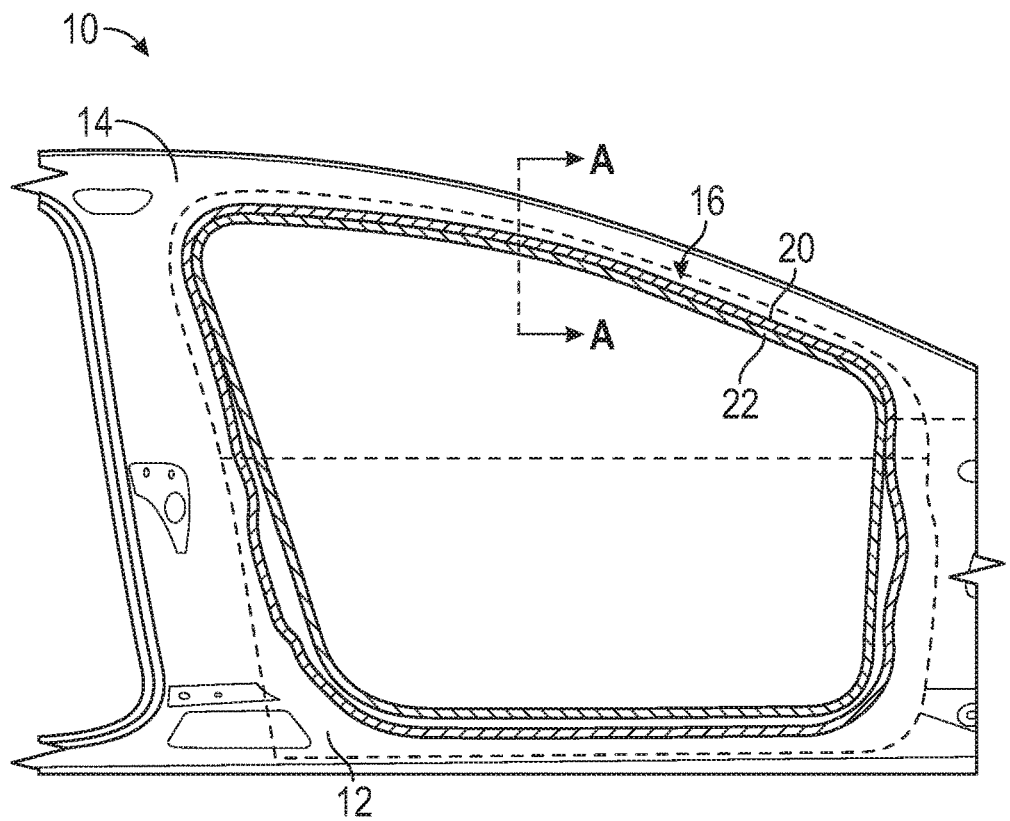
FIG. 1 illustrates a vehicle equipped with a sealing system for sealing between a vehicle body and a closure member.

FIG. 1 schematically illustrates select portions of a vehicle 10. The vehicle 10 may be a car, a truck, a van, a sport utility vehicle, or any other type of vehicle. The vehicle 10 could also be a conventional motor vehicle, a battery powered hybrid or electric vehicle, or an autonomous vehicle (i.e., a driverless vehicle).

Although a specific component relationship is illustrated in the figures of this disclosure, the illustrations are not intended to limit this disclosure. In other words, the placement and orientation of the various components of the vehicle 10 are shown schematically and could vary within the scope of this disclosure. In addition, the various figures accompanying this disclosure are not necessarily to scale, and some features may be exaggerated or minimized to show certain details of a particular component.

The vehicle 10 includes a closure member 12 movably mounted to a vehicle body 14. For example, the closure member 12 could be pivotally mounted to the vehicle body 14 for allowing passengers to enter or exit the vehicle 10. In an embodiment, the closure member 12 is a side door of the vehicle 10. However, other vehicle closure members, including but not limited to liftgates, hoods, decklids, etc., could also benefit from the teachings of this disclosure. In addition, although only a single closure member is illustrated in FIG. 1, the vehicle 10 could include multiple closure members having sealing designs similar to those described herein.

The vehicle 10 is additionally equipped with a sealing system 16 for sealing a gap 18 between the closure member 12 and the vehicle body 14. Sealing the gap 18 creates a watertight seal around a periphery of the closure member 12 and reduces noise intrusion into the passenger compartment of the vehicle 10.

Figure 2:
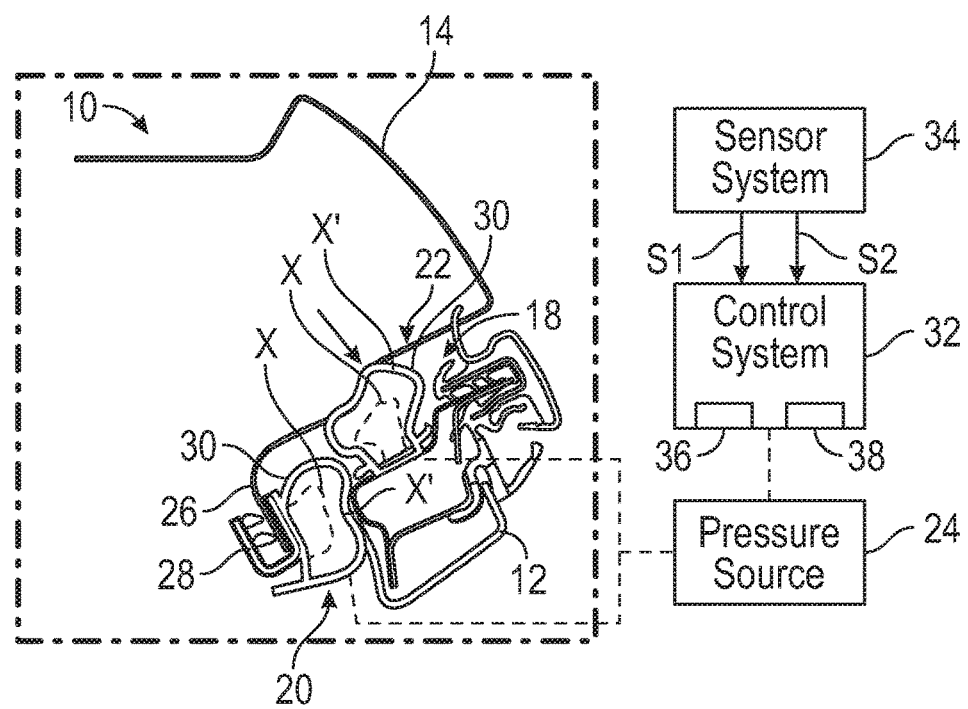
FIG. 2 is a cross-sectional view through section A-A of FIG. 1 and illustrates the sealing system during a driving event.

Referring now to FIGS. 1 and 2, the sealing system 16 may include a first seal 20 mounted to the vehicle body 14, a second seal 22 mounted to the closure member 12, and a pressure source 24 for selectively inflating or deflating the first seal 20, the second seal 22, or both. The first seal 20 and the second seal 22 may be elastomeric weatherstrips that are interposed throughout the entire running space between the closure member 12 and the vehicle body 14. The first seal 20 and the second seal 20 continuously extend about the periphery of the closure member 12 in order to seal an entirety of the gap 18. In other words, the first seal 20 and the second seal 22 completely circumscribe the body opening that is closed by the closure member 12. In an embodiment, the first seal 20 is secured to a flange 26 of the vehicle body 14 by a seal carrier 28 (see FIG. 2) and the second seal 22 is secured to the closure member 12 using either push-pins or a suitable adhesive.

The pressure source 24 may be a pump or a compressor for communicating a fluid, such as compressed air, into or out of a bulb section 30 of the first seal 20, the second seal 22, or both. Although shown schematically, the pressure source 24 may be mounted directly to a portion of the vehicle body 14.

In a first embodiment, as shown in FIG. 2, the pressure source 24 may be actuated to inflate the bulb sections 30 of the first and second seals 20, 22 between a first position X (shown in phantom) and a second position X'. The seals 20, 22 are expanded to an increase cross-sectional size in the second position X', thereby reducing noise intrusion by generating increased contact between the first seal 20 and the closure member 12 and between the second seal 22 and the vehicle body 14.

Figure 3:
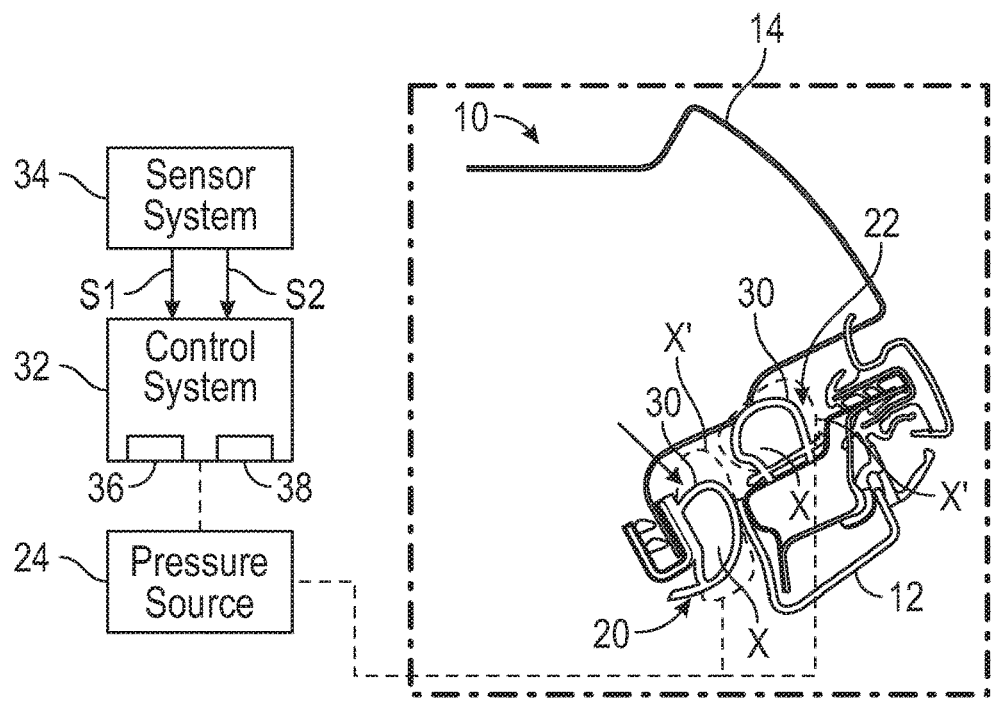
FIG. 3 is another cross-sectional view through section A-A of FIG. 1 and illustrates the sealing system during a closing event of the closure member.

In a second embodiment, as shown in FIG. 3, the pressure source 24 may be actuated to deflate the bulb sections 30 of the first and second seals 20, 22 from the second position X' (shown in phantom) to the first position X. The cross-sectional sizes of the bulb sections 30 are reduced in the first position X such that the seals 20, 22 barely touch the closure member 12 and the vehicle body 14, respectively. The seals 20, 22 may be deflated during door closing events in order to reduce the amount of door closing effort necessary to close the closure member 12.

The sealing system 16 may additionally include a control system 32 and a sensor system 34. The control system 32 includes a processor 36 and memory 38. The control system 32 may include one more control modules equipped with executable instructions for interfacing with and commanding operation of various components of the sealing system 16, such as the pressure source 24, for example. Each such control module may include a processor and non-transitory memory for executing the various control strategies and modes of the sealing system 16.

The processor 36, in an embodiment, is configured to execute one or more programs stored in the memory 38 of the control system 32. A first exemplary program, when executed, may determine when to inflate the bulb sections 30 of the first and second seals 20, 22. A second exemplary program, when executed, may determine when to deflate the bulb sections 30. The control system 32 may additionally control various other functions associated with the sealing system 16.

The sensor system 34 may include one or more sensors positioned at various locations throughout the vehicle 10 for aiding the determination of when to inflate/deflate the first and second seals 20, 22. In a first embodiment, the sensor system 34 detects whether a vehicle driving event is occurring (i.e., the vehicle 10 is turned ON or is operating above a predefined speed threshold). In another embodiment, the sensor system 34 detects if the closure member 12 is opened.

The sensor system 34 may send a first signal S1 to the control system 32 if a vehicle driving event is detected. In response to receiving the first signal S1, the control system 32 commands the pressure source 24 to inflate the bulb sections 30 of the first and second seals 20, 22 to the second position X'. The inflated seals 20, 22 reduce noise during the driving event by increasing the contact between the first seal 20 and the closure member 12 and between the second seal 22 and the vehicle body 14.

The sensor system 34 may send a second signal S2 to the control system 32 if the closure member 12 is determined to be in an open position. This indicates that the closure member 12 is likely to soon be closed. In response to receiving the second signal S2, the control system 32 commands the pressure source 24 to deflate the bulb sections 30 of the first and second seals 20, 22 back toward the first position X. The deflated seals 20, 22 reduce the forced contact between the first seal 20 and the closure member 12 and between the second seal 22 and the vehicle body 14, thereby reducing the amount of door closing effort necessary to close the closure member 12.

Figure 4A:
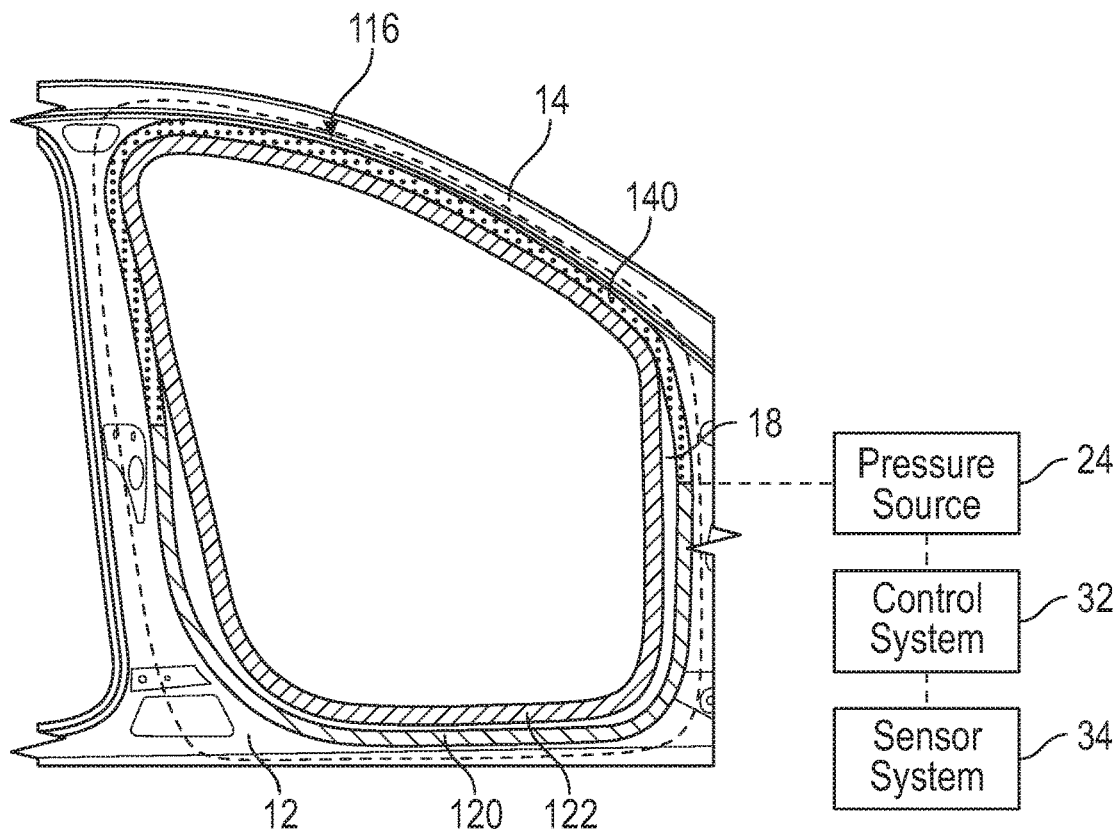
FIGS. 4A and 4B illustrate a vehicle closure member sealing system having localized inflatable geometric features.
Figure 4B:
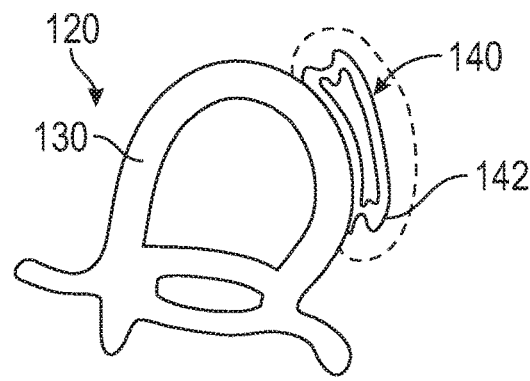

FIGS. 4A and 4B illustrate another exemplary sealing system 116 for sealing the gap 18 between the closure member 12 and the vehicle body 14. The sealing system 116 may include a first seal 120 and a second seal 122. The first seal 120 is mounted to the vehicle body 14, and the second seal 122 is mounted to the closure member 12. In this embodiment, only a localized portion of the first seal 120 is inflatable, whereas a remaining portion of the first seal 120 and the entire second seal 122 are not inflatable.

In an embodiment, the first seal 120 includes an inflatable geometric feature 140 that is either formed on (e.g., molded) or attached to a bulb section 130 of the first seal 120. The inflatable geometric feature 140 extends along a discrete portion of the first seal 120 rather than across an entirety of the first seal 120. Thus, once inflated, the inflatable geometric feature 140 provides "localized" sealing at the locations of the first seal 120 that are most susceptible to noise intrusion.

In an embodiment, the inflatable geometric feature 140 includes a bulb section 142 that is separate from the bulb section 130 of the seal 120. The bulb section 142 of the inflatable geometric feature 140 may be inflated (shown schematically using phantom lines) to avoid door seal slap during vehicle driving events. Door seal slap is a slapping noise that may occur due to vibration of the vehicle body 14 during road input while driving or during high speed driving conditions or uneven road surfaces. During high speed driving, the pressure differential between the inside and the outside of the passenger cabin can pull the outer panel of the closure member 12 away from the vehicle body 14, thus causing the seal(s) to move away from each other and then produce air leak or noise into the cabin. Similarly, when driving on uneven road surfaces, the road input to the closure member 12 through the latch and body will cause the seals to slap against the closure member 12 and/or the vehicle body 14 and produce the noise. In the inflated position, the bulb section 142 has an increased cross-sectional size as compared to its non-inflated position. The bulb section 130 could also be deflated during door closing events. The inflation/deflation of the bulb section 142 of the inflatable geometric feature 140 can be controlled by a control system 32, a sensor system 34, and a pressure source 24 in a manner similar to that described above with respect to FIGS. 1, 2, and 3.

The inflatable geometric feature 140 may include any size or shape. In an embodiment, the size and shape of the inflatable geometric feature 140 mimics the size and shape of the gap that extends between the closure member 12 and the vehicle body 14. In this way, the sealing provided by the sealing system 116 can be specifically tuned to address different sealing requirements for different vehicles. The design of the geometric feature 140 can be function of the vehicle body 14 or closure member 12 profile and is optimized according to the door closing effort, door seal slap, and door dynamic deflection under high speed driving. The feature can be molded locally or formed as a single profile.

Figure 5:
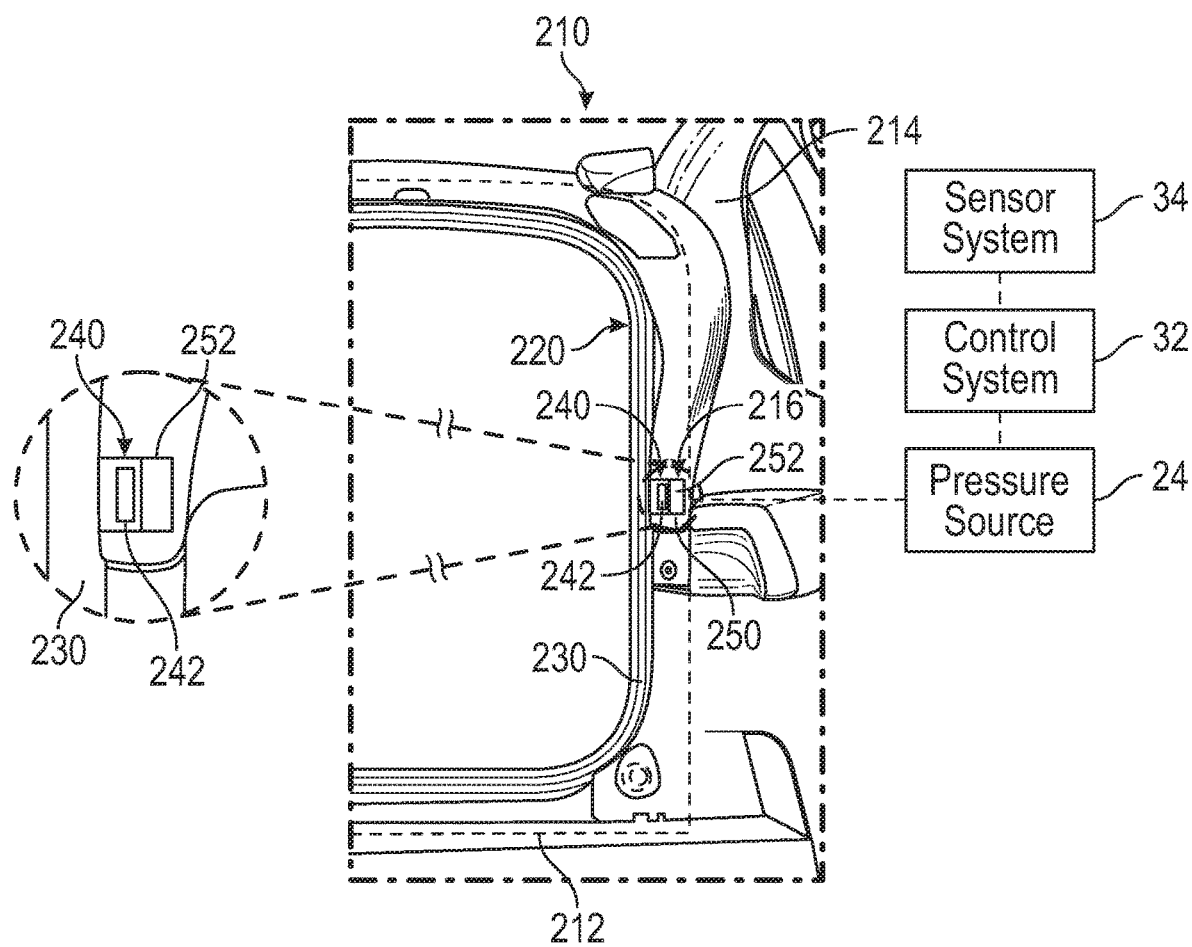
FIG. 5 illustrates another exemplary vehicle closure member sealing system.

FIG. 5 illustrates another exemplary sealing system 216 for sealing a gap 250 between a closure member 212 and a vehicle body 214 of a vehicle 210. In this embodiment, the closure member 212 is a liftgate of the vehicle 210.

The sealing system 216 may include a first seal 220 and a wedge bumper 252. The first seal 220 and the wedge bumper 252 are both mounted to the vehicle body 214. In this embodiment, a localized portion of the first seal 220 is inflatable to increase the amount of sealing contact achieved between the first seal 220 and the wedge bumper 252 during vehicle driving events.

In an embodiment, the first seal 220 includes an inflatable geometric feature 240 that is either formed on (e.g., molded) or attached to a bulb section 230 of the first seal 220. The inflatable geometric feature 240 extends along a discrete portion of the first seal 220. Thus, once inflated, the inflatable geometric feature 240 provides "localized" sealing at the interface between the first seal 220 and the wedge bumper 252.

In an embodiment, the inflatable geometric feature 240 includes a bulb section 242 that is separate from the bulb section 230 of the seal 120. The bulb section 242 of the inflatable geometric feature 240 may be inflated to avoid rattling or chucking during vehicle driving events. Chucking is a high frequency noise caused by excessive relative motion and contact between the body mounted latching mechanism and the closure member 212 during certain driving conditions. In the inflated position, the bulb section 242 has an increased cross-sectional size as compared to its non-inflated position. The bulb section 242 can be deflated during door closing events. The inflation/deflation of the bulb section 242 of the inflatable geometric feature 240 can be controlled by a control system 32, a sensor system 34, and a pressure source 24 in a manner similar to that described above with respect to FIGS. 1, 2, and 3.

The inflatable geometric feature 240 may include any size or shape. In an embodiment, the size and shape of the inflatable geometric feature 240 mimics the size and shape of the wedge bumper 252 to provide an improved sealing interface between the first seal 220 and the wedge bumper 252.

Figure 6:
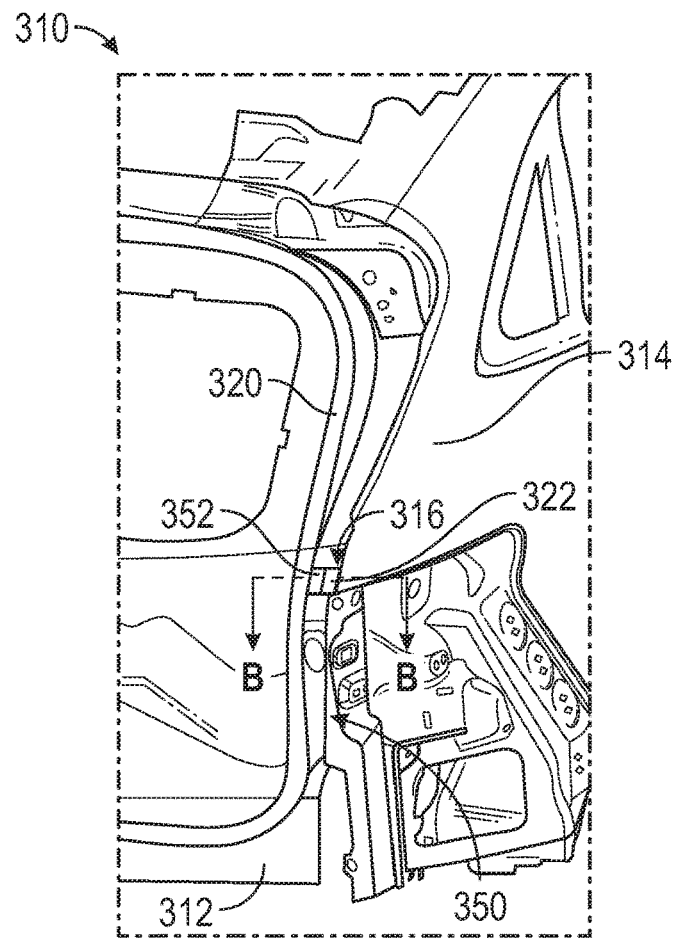
FIG. 6 illustrates yet another exemplary vehicle closure member sealing system.
Figure 7:
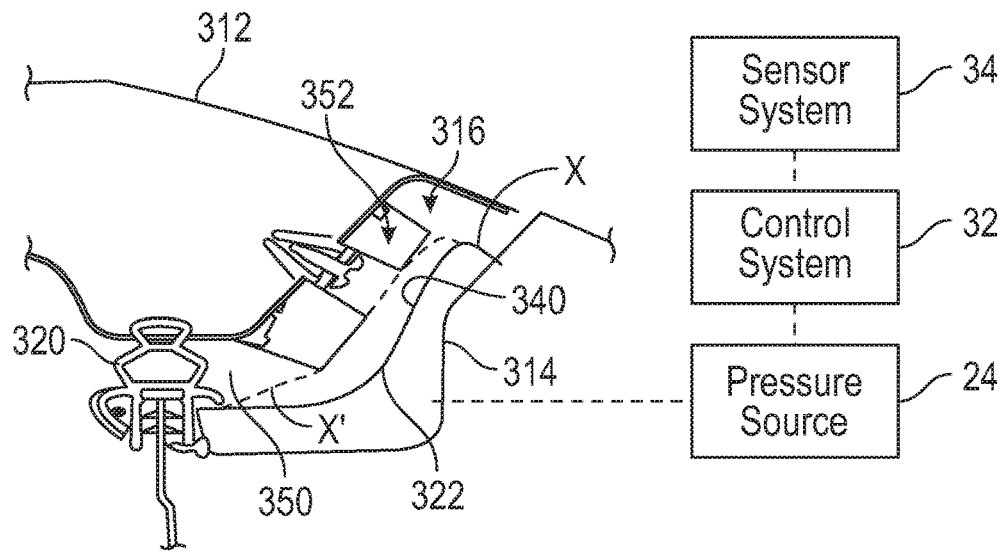
FIG. 7 is a cross-sectional view through section B-B of FIG. 6.

FIGS. 6-7 illustrate yet another exemplary sealing system 316 for sealing a gap 350 between a closure member 312 and a vehicle body 314 of a vehicle 310. In this embodiment, the closure member 312 is a liftgate of the vehicle 310.

The sealing system 316 may include a first seal 320, a second seal 322, and wedge bumper 352. The first seal 320 and the second seal 322 are mounted to the vehicle body 314, and the wedge bumper 352 is mounted to the closure member 312. In this embodiment, a localized portion of the second seal 322 is inflatable to increase the amount of contact between the second seal 322 and the wedge bumper 352 during vehicle driving events.

In an embodiment, the second seal 322 includes an inflatable geometric feature 340 that is either formed on (e.g., molded) or attached to second seal 322. The inflatable geometric feature 340 may be inflated to avoid rattling or chucking during vehicle driving events. In the inflated position, the inflatable geometric feature 340 is in sealing contact with the wedge bumper 352. The inflatable geometric feature 340 can be deflated during liftgate closing events. The inflation/deflation of the inflatable geometric feature 340 can be controlled by a control system 32, a sensor system 34, and a pressure source 24 in a manner similar to that described above with respect to FIGS. 1, 2, and 3.

Figure 8:
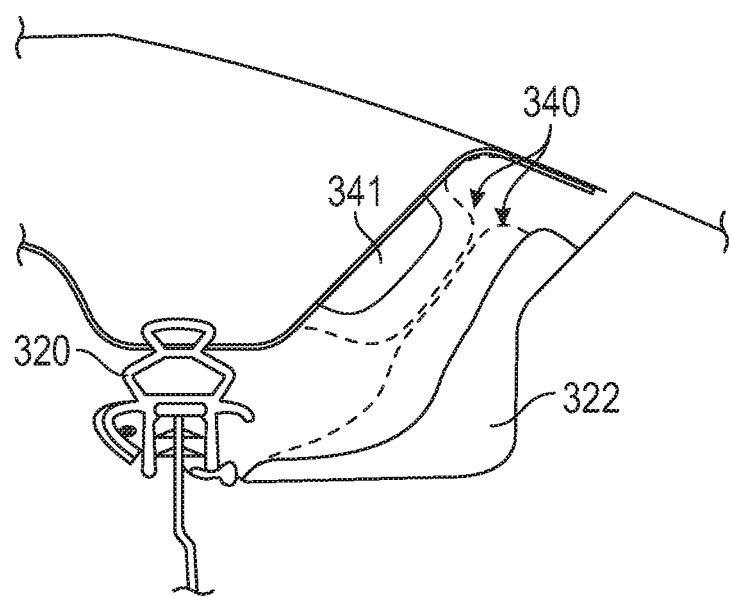
FIG. 8 is a cross-sectional view of yet another exemplary vehicle closure member sealing system.

In an alternative embodiment, shown in FIG. 8, the second seal 322 and a wedge seal 341 include inflatable geometric features 340 (shown in phantom). The inflatable geometric features 340 may be inflated to improve sealing contact between the second seal 322 and the wedge seal 341. This particular design eliminates the need for wedge bumpers.

The vehicle closure member sealing systems described herein reduce closing energy while increasing sealing contact during driving conditions for achieving reduced noise transmission into the passenger cabin. These advantages are provided without adding mass to the vehicle. Further, the sealing systems of this disclosure can be tailored to meet various closures configurations by tuning the seal design. Further, the length and shape of geometrical features on the seals can be optimized for robustness. The pressurized sealing system designs provide additional robustness to combat variations in the seal gap resulting from the manufacturing process without compromising performance.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle closure member sealing system, comprising:
a first seal including a first bulb section,
wherein the first bulb section is non-inflatable;
an inflatable geometric feature confined to only a discrete portion of an overall length of the first seal, wherein the inflatable geometric feature includes a second bulb section separate from the first bulb section; and
a pressure source configured to communicate a fluid into the second bulb section to inflate the inflatable geometric feature between a first position and a second position.

2. The vehicle closure member sealing system as recited in claim 1, wherein the pressure source is a pump and the fluid is a compressed air.

3. The vehicle closure member sealing system as recited in claim 1, wherein the first seal is an elastomeric weatherstrip.

4. The vehicle closure member sealing system as recited in claim 1, comprising a control system configured to command the pressure source to communicate the fluid during vehicle driving events.

5. The vehicle closure member sealing system as recited in claim 4, wherein the vehicle driving events are detected by a sensor system.

6. The vehicle closure member sealing system as recited in claim 4, wherein the control system is configured to command the pressure source to deflate the inflatable geometric feature during door closing events.

7. The vehicle closure member sealing system as recited in claim 1, wherein the inflatable geometric feature is molded into the first seal.

8. The vehicle closure member sealing system as recited in claim 1, wherein the inflatable geometric feature is attached to the first seal.

9. The vehicle closure member sealing system as recited in claim 1, wherein the first seal seals against a wedge bumper.

10. The vehicle closure member sealing system as recited in claim 1, wherein the first seal is mounted to a vehicle body, and comprising a second seal mounted to a side door.

11. The vehicle closure member sealing system as recited in claim 1, wherein the first seal is mounted to a vehicle body.

12. The vehicle closure member sealing system as recited in claim 1, wherein the inflatable geometric feature is disposed along an exterior surface of the first seal.

13. The vehicle closure member sealing system as recited in claim 1, wherein the second bulb section is non-fluidly connected to the first bulb section.

14. The vehicle closure member sealing system as recited in claim 1, wherein the discrete portion includes a first length that is less than a second length of the first seal.

15. The vehicle closure member sealing system as recited in claim 1, wherein, in the second position, the inflatable geometric feature provides localized sealing along only the discrete portion of the first seal.

16. A vehicle, comprising:
a vehicle body;
a closure member mounted to the vehicle body; and
an elastomeric seal for sealing a gap between the vehicle body and the closure member,
wherein the elastomeric seal includes a non-inflatable bulb section and a geometric feature extending along only a discrete portion of an exterior surface of the elastomeric seal,
wherein an inflatable bulb section of the geometric feature is non-fluidly connected to the non-inflatable bulb section.

17. A vehicle, comprising:
a vehicle body;
a liftgate movably mounted to the vehicle body;
a first seal mounted to the vehicle body and including a non-inflatable bulb section;
a second seal mounted to the vehicle body and including an inflatable geometric feature,
wherein the inflatable geometric feature is localized along only a discrete portion of the second seal;
a wedge bumper mounted to the liftgate;
a sensor system configured to monitor a vehicle speed;
a pressure source configured for inflating the inflatable geometric feature; and
a control system configured to command the pressure source to inflate the inflatable geometric feature from a first position to a second position in response to the vehicle speed exceeding a predefined speed threshold,
wherein, in the second position, the inflatable geometric feature is in sealing contact with the wedge bumper.

\* \* \* \* \*